United States Patent [19]

Pocci

[11] Patent Number: 4,982,505
[45] Date of Patent: Jan. 8, 1991

[54] GAUGE FOR MEASURING BOTH THE DEPTH AND THE DIAMETER OF A BORE HOLE

[76] Inventor: Silvano Pocci, 9 Eric Dr., Kinnelon, N.J. 07405

[21] Appl. No.: 516,088

[22] Filed: Apr. 16, 1990

[51] Int. Cl.[5] ............................ G01B 5/12; G01B 5/18
[52] U.S. Cl. ................................... 33/542; 33/544; 33/836; 33/808
[58] Field of Search ................ 33/836, 544, 807, 542, 33/302, 1 H, 808, 555.3, 558

[56] References Cited

U.S. PATENT DOCUMENTS

| | | | |
|---|---|---|---|
| 3,685,158 | 8/1972 | Planche | 33/302 |
| 3,922,792 | 12/1975 | Ito | 33/542 |
| 3,995,373 | 12/1976 | Brumbelow | 33/542 |
| 4,914,826 | 4/1990 | Nold, III | 33/544 |

Primary Examiner—William A. Cuchlinski, Jr.
Assistant Examiner—William C. Dowling
Attorney, Agent, or Firm—Alfred C. Hill

[57] ABSTRACT

A gauge for measuring both the depth and the diameter of a bore hole comprises a member having a first longitudinal slot therethrough and a surface perpendicular to the slot to engage the face of the bore hole; a first arrangement slidably engaging the slot adjacent one end thereof having a first protrusion extending below the surface; a second arrangement slidably engaging the member adjacent the other end of the slot having first and second arms thereon each disposed at a given angle with respect to and on opposite sides of the member, each of the first and second arms having a second protrusion extending below the surface; the first protrusion and second protrusions engaging a selected one of an inner surface of the bore hole and an outer surface concentric with the inner surface of the bore hole to cooperate in aligning the member with the center line and the diameter of the bore hole; a third arrangement slidably engaging the first slot and the member to measure the depth of the bore hole; and a fourth arrangement slidably engaging the first slot and a first portion of the third arrangement and having a first thereof pivotably connected to a second portion of the third arrangement and a second portion thereof slidably engaging a third portion of the third arrangement to measure the diameter of the bore hole.

20 Claims, 3 Drawing Sheets

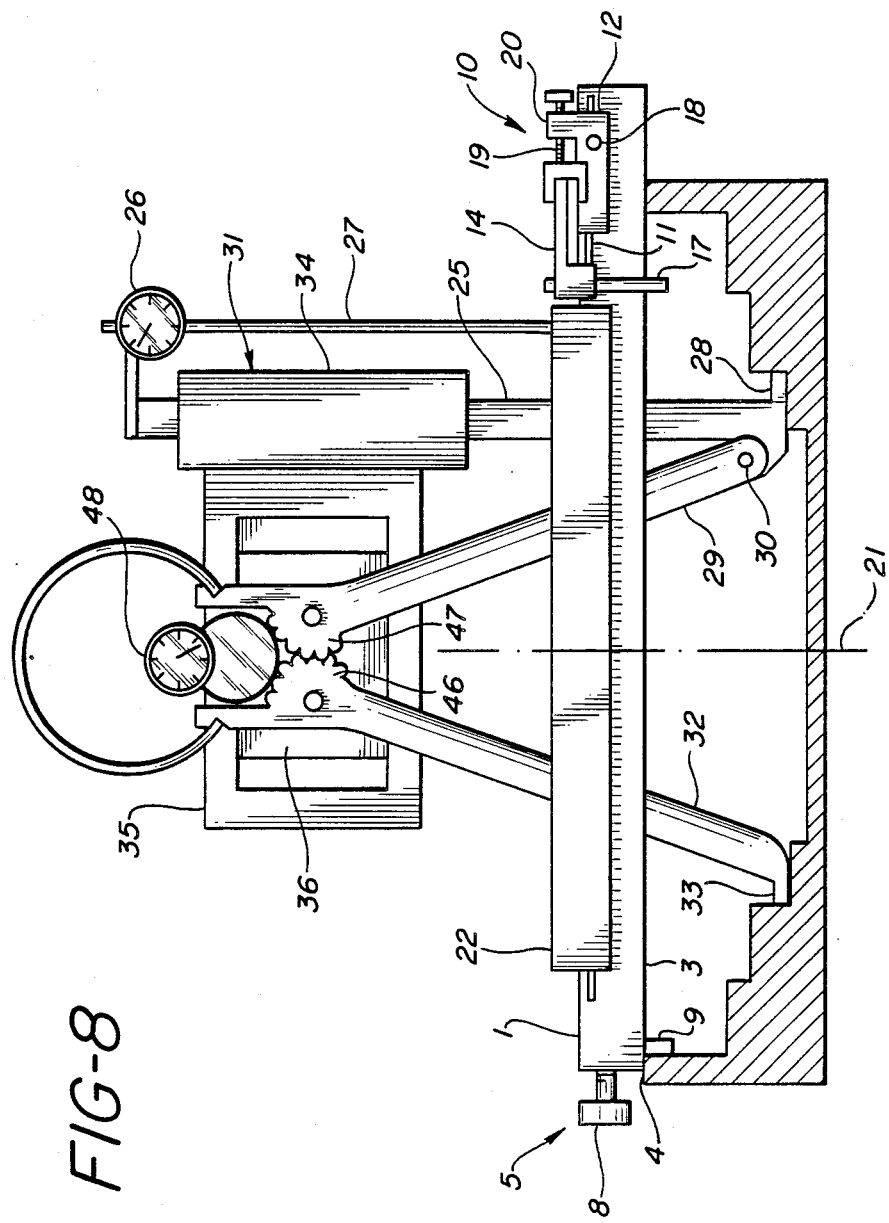

GAUGE FOR MEASURING BOTH THE DEPTH AND THE DIAMETER OF A BORE HOLE

BACKGROUND OF THE INVENTION

The present invention relates to measuring devices and more particularly to a gauge for measuring both the depth and the diameter of a bore hole.

The measurement of single or multiple dimeters and depths of bore holes now accomplished with the use of telescope gauges, inside micrometers, dial bore gauges, calipers, digital micrometers and plug gauges often requires having to have different measuring instruments for each of the various diameters to be machined and inspected.

In the case of plug gauges and dial bore gauges, the narrow range of measurement of this type of tool requires the possession of a large inventory of plug gauges in incremental sizes for general machining and inspection work.

Telescope gauges and inside micrometers have a somewhat greater range, but are difficult to use in bore holes beyond the depth of the handles.

Telescope gauges and calipers have the additional disadvantage of inaccuracy due to the need for "feel" on the part of the machinist and inspector to estimate true size.

All of the instruments above were solely for the purpose of diameter measurements only.

The measurements of depths of each diameter is accomplished quite well by the use of vernier calipers, micrometer depth gauges and digital depth gauges, but this is accomplished separately from the measurement of diameters.

In practice, the measurement of bore holes of various close-tolerance diameters at various depths requires a multiplicity of tools and a significant expenditure of time in the location and use of these tools by both the machinist doing the work and the inspector who must verify the work done.

SUMMARY OF THE INVENTION

An object of the present invention is to provide a single gauge to measure the depth and the diameter of a bore hole whether a single diameter and single depth bore hole or a multiple diameter and multiple depth bore hole.

A feature of the present invention is the provision of a gauge for measuring both the depth and the diameter of a bore hole comprising first means having a first longitudnal slot therethrough and a surface perpendicular to the first slot to engage the face of the bore hole; second means slidably engaging the first slot adjacent one end thereof having a first protrusion extending below the surface; third means slidably engaging the first means adjacent the other end of the first slot having first and second members each disposed at a given angle with respect to and on opposite sides of the first means, each of the first and second members having a second protrusion extending below the surface; the first protrusion and the second protrusions engaging a selected one of an inner surface of the bore hole and an outer surface concentric with the inner surface of the bore hole to cooperate in aligning the first means with the center line and the diameter of the bore hole; fourth means slidably engaging the first slot and the first means to measure the depth of the bore hole; and fifth means slidably engaging the first slot and a first portion of the fourth means and having a first portion thereof pivotably connected to a second portion of the fourth means and a second portion thereof slidably engaging a third portion of the fourth means to measure the diameter of the bore hole.

BRIEF DESCRIPTION OF THE DRAWING

FIG. 8 is a plan view of an alternative embodiment of the gauge for measuring both the depth and the diameter of a bore hole in accordance with the principles of the present invention.

DESCRIPTION OF THE PREFERRED EMBODIMENTS

The difference between the two embodiments is the mechanism employed to cause the caliper legs to maintain an equal distance between the center line of the bore hole. The description that follows with respect to FIGS. 1 and 8 will be directed toward the common elements of the two embodiments illustrated.

Figure 3:
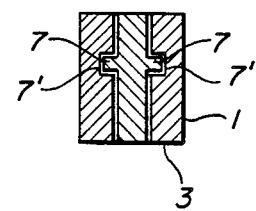
FIG. 3 is a cross-sectional view taken along line 3—3 of FIG. 1.

In accordance with the principles of the invention the gauge for measuring both the depth and the diameter of a bore hole includes a first means in the form of a beam-like member 1 having a longitudnal slot 2 extending therethrough and a surface 3 perpendicular to slot 2 to engage the face 4 of a bore which may be a single diameter and single depth bore hole or a multiple diameter and multiple depth bore hole as illustrated in FIG. 8. A second means in the form of a left alignment unit 5 includes a block-like member 6 having a tenon 7 slidably received in a mortise 7' disposed within slot 2 to provide a dovetail-like arrangement to limit left alignment unit 5 to only longitudnal movement in slot 2 of member 1 as shown in FIG. 3. Unit 5 cannot be lifted vertically out of slot 2. Although alignment unit 5 is shown in an exploded arrangement in FIG. 1 it actually is disposed within slot 2 in a dovetail-like manner for slidable movement in slot 2. Alignment unit 5 further includes a threaded member 8 and a protrusion 9 that extends below surface 3 of member 1.

Figure 2:
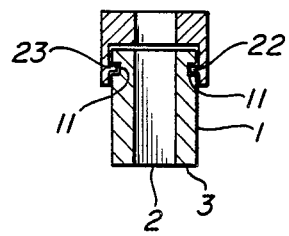
FIG. 2 is a cross-sectional view taken along line 2—2 of FIG. 1.

The gauge further includes a right alignment unit 10 which has a tenon 11' slidably engaging a mortise 11 in the outer surface of member 1 in a dovetail-like manner. The right alignment unit 10 includes a channel-like member 12 which has tenon 11' formed therein to engage mortise 11 in member 1 for only longitudnal slidable movement with respect to member 1. Member 12 has secured thereto a first member 13 and a second member 14 each disposed at a given angle with respect to and on opposite sides of member 1. Members 13 and 14 are interconnected by linkage 15 and have extending therefrom second protrusions 16 and 17, respectively, which extends below surface 3 of member 1. A thumb screw 18, or the like, arranged in member 12 maintains the position of member 12 relative to member 1 upon coarse positioning of protrusions 16 and 17. A threaded member 19 extends through an upwardly extending portion 20 of member 12 in a threaded manner to enable a fine adjustment of the position of protrusions 16 and 17. The slidable relationship between member 12 and member 1 is similar to the cross-section shown in FIG. 2 wherein a dovetail-type arrangement is provided to permit member 12 to slide longitudnally with respect to member 1 but which prevents member 12 from being lifted off of member 1.

Figure 5:
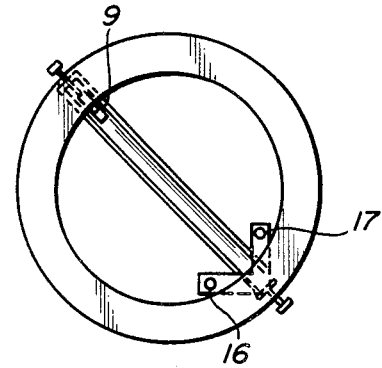
FIG. 5 is a view looking up out of a bore hole showing one orientation of the gauge with respect to the bore hole in accordance with the principles of the present invention to enable measurement of both the depth and the diameter of the bore hole.
Figure 6:
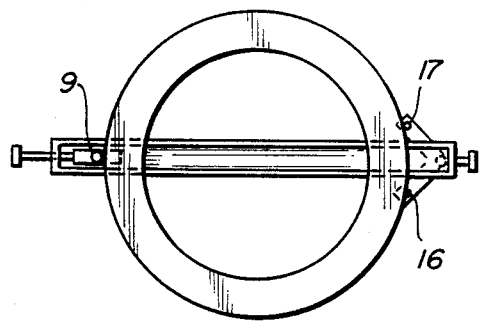
FIG. 6 is a view looking up out of a bore hole showing an alternative orientation of the gauge with respect to the bore hole in accordance with the principles of the present invention to enable measurement of both the depth and the diameter of the bore hole.

In operation member 1 is placed on face 4 of the bore hole and left alignment unit 5 and right alignment unit 10 are coarsely adjusted so that protrusion 9 and protrusions 16 and 17 either engage the inner surface of the bore hole as shown in FIG. 5 or an outer surface which is concentric with the inner surface of the bore hole as shown in FIG. 6 so as to align member 1 with the center line 21 (see FIG. 8) of the bore hole and the diameter of the bore hole to eliminate the inaccuracies that develop employing the prior art type measuring tools for diameter measurement which require a "feel" for the center line of the bore hole and the diameter of the bore hole. After the coarse adjustment in either of the orientations shown in FIGS. 5 and 6 threaded member 8 and 19 are adjusted to provide the desired accuracy of location of member 1.

The gauge of the present invention further includes a fourth means in the form of a channel-like member 22 which slidably engages the outer surface of member 1 in a dovetail-like manner by having a slot 24 therethrough aligned with slot 2. Member 25 extends through and slidably engages slots 2 and 24 in a perpendicular relationship to surface 3. A depth gauge including meter 26 and rod 27 is arranged so that meter 26 is secured to member 25 adjacent an upper end thereof and rod 27 is in contact with the top surface of member 22 so that meter 26 will record the depth of the bore hole when member 25 is moved vertically into the bore hole and a lower end thereof touches the bottom of the bore hole. A first caliper-like measuring tip 28 is secured to the lower end of member 25.

In accordance with the principles of the present invention the gauge further includes a fifth means, which slidably engages slot 2 of member 1 and a first portion of the fourth means, namely, slot 24 of member 22, includes a first portion in the form of a first caliper leg 29 pivotably connected at 30 to the lower end of member 25, a second portion 31 slidably engaging a second portion of the fourth means, namely, an upper portion of member 25, and a third portion in the form of a second caliper leg 32 having caliper-like measuring tip 33 secured thereto on the same plane as measuring tip 28.

Figure 4:
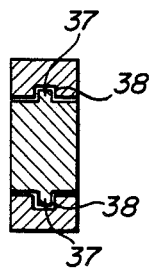
FIG. 4 is a cross-sectional view taken along line 4—4 of FIG. 1.

Both caliper legs 29 and 32 slidably engage slots 2 and 24 and have a member in the form of ways 35 secured to member 34, the sliding part of portion 31, which contains therein a carrier 26 including tenons 37 engaging mortises 38 in ways 35 as shown in FIG. 4. Carrier 36 has secured thereto caliper legs 29 and 32 in a pivotable relationship. Member 34 is able to move vertically on member 25 and carrier 36 is able to move within ways 35 at right angles to member 34 and parallel to surface 3 of member 1.

The remainder of the description will be directed to the modifications providing the two different embodiments of the gauge of the instant application.

Figure 1:
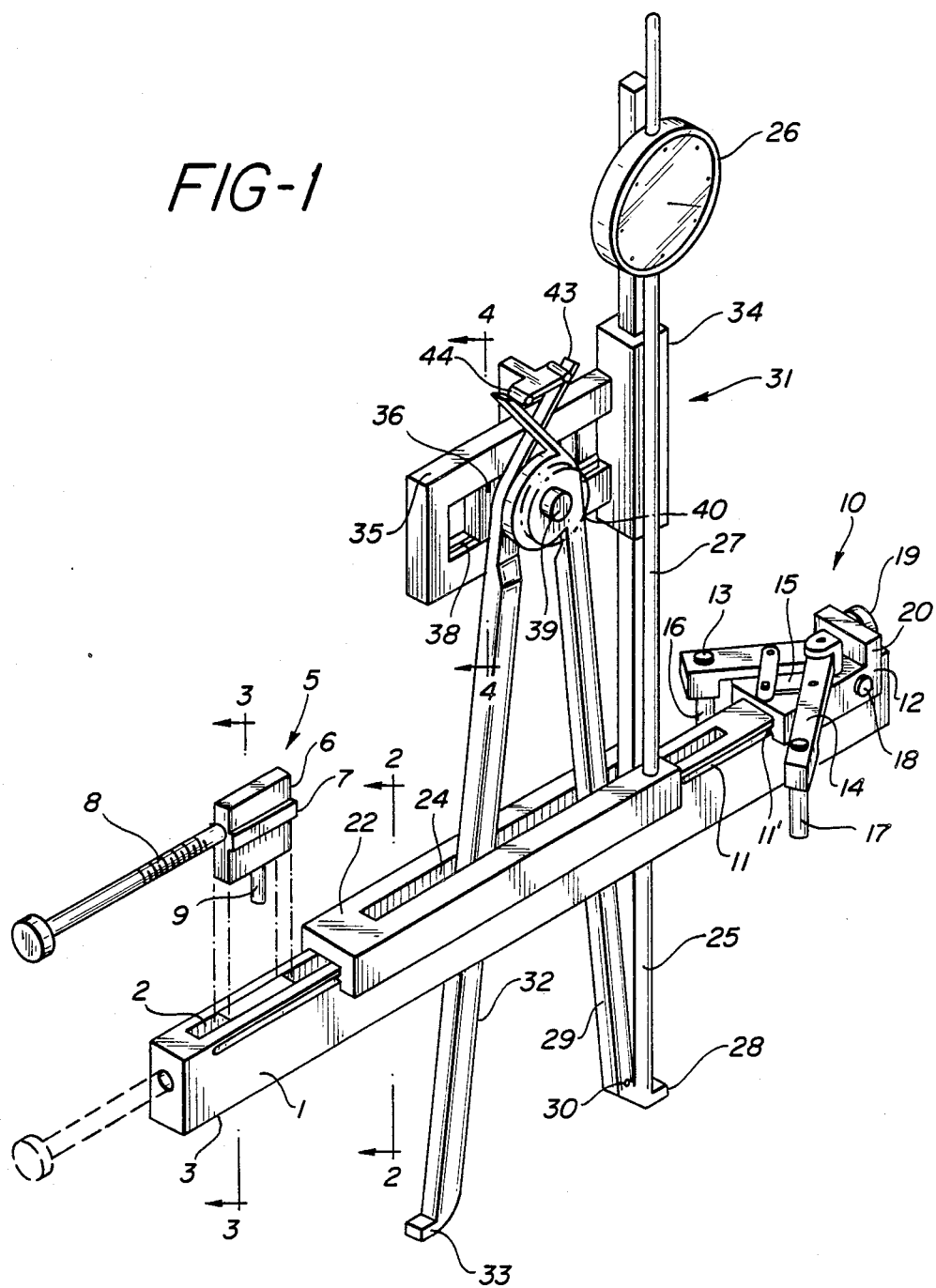
FIG. 1 is a perspective view, partially exploded, of the gauge for measuring both the depth and the diameter of a bore hole in accordance with the principle of the present invention.
Figure 7:
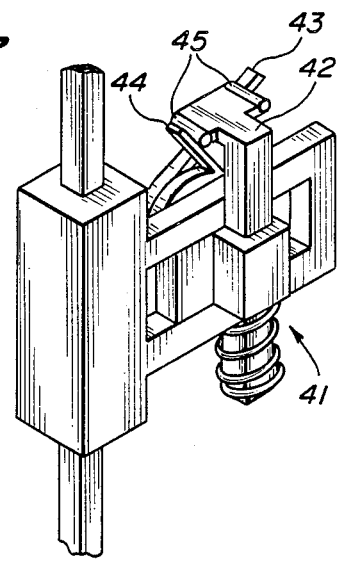
FIG. 7 is a perspective view showing a detail of the gauge of FIG. 1.

Referring to FIG. 1 hub 39 of caliper legs 29 and 32 whose movement actuates the meter 40 is secured to carrier 36. Also carried by carrier 36 is a spring loaded arrangement 41 shown in more detail in FIG. 7 which acts to pull the T-shaped member 42 against extensions 43 and 44 of caliper legs 29 and 32. This pulling action is in alignment with the center line of the caliper legs which is the center line 21 of the bore hole and is perpendicular to member 1. This actually keeps both caliper legs 29 and 32 equidistant from the center line of the caliper legs and the center line 21 of the bore hole with the result that no matter to what depth member 25 is put, or at whatever the degree of extension of the caliper legs, measuring tips 28 and 33 of caliper legs 29 and 32 are always centered in the bore hole and directly opposite each other to take an accurate measurement of the diameter. This degree of openness of the caliper legs 29 and 30 when applied to the meter 40 gives an accurate reading of the diameter.

The ultimate purpose of unit 41 and its T-shaped member 42 is to keep caliper legs 29 and 32 equidistant from the vertical center line of the bore hole. Tips 28 and 32 of caliper legs 29 and 32 are in a plane at right angles to the vertical center line 21 of the bore hole by contact of surface 3 of member 1 with the face of a bore hole while at the same time being held precisely at the bore hole diameter through the cooperation of protrusions 9, 16 and 17.

The embodiment illustrated in FIG. 8 accomplishes the same thing as unit 41 through the use of gears 46 and 47 formed in or attached to caliper legs 29 and 32. Gears 46 and 47 also cooperate to drive the measuring dial 48 to record the dimensions of the diameter of the bore hole.

In employing the gauge of the instant application the operator moves member 25 into the bore hole to obtain a reading of the depth of the bore hole from meter 26. The operator then would move member 34 downwardly on member 25 until the tips 28 and 33 make contact with the sidewalls or inner surface of the bore hole at which time the operator would get the diameter reading from meter 40.

While I have described above the principles of my invention in connection with specific apparatus, it is to be clearly understood that this description is made only by way of example and not as a limitation to the scope of my invention as set forth in the objects thereof and in the accompanying claims.

I claim:

1. A gauge for measuring both the depth and the diameter of a bore hole comprising:
   first means having a first longitudinal slot therethrough and a surface perpendicular to said first slot to engage the face of said bore hole;
   second means slidably engaging said first slot adjacent one end thereof having a first protrusion extending below said surface;
   third means slidably engaging said first means adjacent the other end of said first slot having first and second members each disposed at a given angle with respect to and on opposite sides of said first means, each of said first and second members having a second protrusion extending below said surface;

said first protrusion and said second protrusions engaging a selected one of an inner surface of said bore hole and an outer surface concentric with said inner surface of said bore hole to cooperate in aligning said first means with the center line and the diameter of said bore hole;

fourth means slidably engaging said first slot and said first means to measure the depth of said bore hole; and fifth means slidably engaging said first slot and a first portion of said fourth means and having a first portion thereof pivotably connected to a second portion of said fourth means and a second portion thereof slidably engaging a third portion of said fourth means to measure the diameter of said bore hole.

2. A gauge according to claim 1, wherein
said first means includes a beam-like member having said first slot therethrough over a predetermined length thereof and said surface is a machined surface of said beam-like member perpendicular to said first slot.

3. A gauge according to claim 2, wherein
said second means includes a block-like member slidably disposed in said first slot and secured therein in a dovetail-like manner and a first threaded member connected to said block-like member and extending through an end of said beam-like member in a threaded manner to enable a fine adjustment of the position of said first protrusion.

4. A gauge according to claim 3, wherein
said third means includes a first channel-like member slidably engaging an outer surface of said beam-like member and secured thereto in a dovetail-like manner, said first and second members being adjustably secured to a surface of said first channel-like member parallel to said surface of said beam-like member, a linkage arrangement to interconnect said first and second members to maintain said given angle, a securing means disposed in said first channel-like member to maintain the position of said first channel-like member relative to said beam-like member upon coarse positioning of said second protrusions, and a second threaded member connected to said first and second members and extending through an upwardly extending portion of said first channel-like member in a threaded manner to enable a fine adjustment of the position of said second protrusions.

5. A gauge according to claim 4, wherein
said fourth means includes a second channel-like member slidably engaging said outer surface of said beam-like member in a spaced relation to said first channel-like member and secured to said beam-like member in a dovetail-like manner, said second channel-like member having a second longitudnal slot therethrough aligned with said first slot, a rod-like member extending through and slidably engaging said first and second slots in a perpendicular relationship with said surface of said beam-like member, a depth gauge secured to said rod-like member adjacent an upper end thereof and in contact with said second channel-like member to record the depth of said bore hole when said rod-like member is moved vertically into said bore hole and a lower end therof touches the bottom of said bore hole, and a first caliper-like measuring tip secured to said lower end of said rod-like member.

6. A gauge according to claim 5, wherein
said fifth means includes two caliper legs interconnected at an upper end thereof, said caliper legs slidably engaging said first and second slots, one of said caliper legs having a lower end thereof pivotably connected to said lower end of said rod-like member adjacent said first caliper-like measuring tip and the other of said caliper legs having a second caliper-like measuring tip secured to a lower end thereof in the same plane as said first caliper-like measuring tip, a third member slidably engaging said rod-like member adjacent said upper end thereof, a fourth member connected to said upper end of said caliper legs slidably associated with said third member to enable movement of said upper end of said caliper legs parallel to said surface of said beam-like member, sixth means associated with said upper end of said caliper legs to ensure that said caliper legs are equidistant from said center line of said bore hole and that said first and second caliper-like measuring tips are always centered in said bore hole and directly opposite each other to enable an accurate measurement of said diameter of said bore hole, and meter means associated with said upper end of said caliper legs to record said measurement of said diameter of said bore hole.

7. A gauge according to claim 6, wherein
said sixth means includes a meshed gear-like arrangement connected to said upper end of each of said caliper legs.

8. A gauge according to claim 6, wherein
said sixth means includes a spring loaded T-shaped member carried by said fourth member acting upon extensions of said caliper legs.

9. A gauge according to claim 1, wherein
said second means includes a block-like member slidably disposed in said first slot and secured therein in a dovetail-like manner and a first threaded member connected to said block-like member and threadedly received by said first means to enable a fine adjustment of the position of said first protrusion.

10. A gauge according to claim 9, wherein
said third means includes a first channel-like member slidably engaging an outer surface of said first means, said first and second members being adjustably secured to a surface of said first channel-like member parallel to said surface, a linkage arrangement to interconnect said first and second members to maintain said given angle, a securing means disposed in said first channel-like member to maintain the position of said first channel-like member relative to said first means upon coarse positioning of said second protrusions, and a second threaded member connected to said first and second members and extending through an upwardly extending portion of said first channel-like member in a threaded manner to enable a fine adjustment of the position of said second protrusions.

11. A gauge according to claim 10, wherein
said fourth means includes a second channel-like member slidably engaging said outer surface of said first means in a spaced relation to said first channel-like member, said second channel-like member having a second longitudnal slot therethrough aligned with said first slot, a rod-like member extending through and slidably engaging said first and second slots in a perpendicular relationship with said surface, a depth gauge secured to said rod-like member adjacent an upper end thereof and in contact with said second channel-like member to record the depth of said bore hole when said rod-like member is moved vertically into said bore hole and a lower end thereof touches the bottom of said bore hole, and a first caliper-like measuring tip secured to said lower end of said rod-like member.

12. A gauge according to claim 11, wherein
said fifth means includes two caliper legs interconnected at an upper end thereof, said caliper legs slidably engaging said first and second slots, one of said caliper legs having a lower end thereof pivotably connected to said lower end of said rod-like member adjacent said first caliper-like measuring tip and the other of said caliper legs having a second caliper-like measuring tip secured to a lower end thereof in the same plane as said first caliper-like measuring tip, a third member slidably engaging said rod-like member adjacent said upper end thereof, a fourth member connected to said upper end of said caliper legs slidably associated with said third member to enable movement of said upper end of said caliper legs parallel to said surface of said beam-like member, sixth means associated with said upper end of said caliper legs to ensure that said caliper legs are equidistant from said center line of said bore hole and that said first and second caliper-like measuring tips are always centered in said bore hole and directly opposite each other to enable an accurate measurement of said diameter of said bore hole, and meter means associated with said upper end of said caliper legs to record said measurement of said diameter of said bore hole.

13. A gauge according to claim 12, wherein
said sixth means includes a meshed gear-like arrangement connected to said upper end of each of said caliper legs.

14. A gauge according to claim 12, wherein
said sixth means includes a spring loaded T-shaped member carried by said fourth member acting upon extensions of said caliper legs.

15. A gauge according to claim 1, wherein
said third means includes a first channel-like member slidably engaging an outer surface of said first means, said first and second members being adjustably secured to a surface of said first channel-like member parallel to said surface, a linkage arrangement to interconnect said first and second members to maintain said given angle, a securing means disposed in said first channel-like member to maintain the position of said first channel-like member relative to said first means upon coarse positioning of said second protrusions, and a threaded member connected to said first and second members and extending through an upwardly extending portion of said first channel-like member in a threaded manner to enable a fine adjustment of the position of said second protrusions.

16. A gauge according to claim 15, wherein
said fourth means includes a second channel-like member slidably engaging said outer surface of said first means in a spaced relation to said first channel-like member, said second channel-like member having a second longitudnal slot therethrough aligned with said first slot, a rod-like member extending through and slidably engaging said first and second slots in a perpendicular relationship with said surface, a depth gauge secured to said rod-like member adjacent an upper end thereof and in contact with said second channel-like member to record the depth of said bore hole when said rod-like member is moved vertically into said bore hole and a lower end thereof touches the bottom of said bore hole, and a first caliper-like measuring tip secured to said lower end of said rod-like member.

17. A gauge according to claim 16, wherein
said fifth means includes two caliper legs interconnected at an upper end thereof, said caliper legs slidably engaging said first and second slots, one of said caliper legs having a lower end thereof pivotably connected to said lower end of said rod-like member adjacent said first caliper-like measuring tip and the other of said caliper legs having a second caliper-like measuring tip secured to a lower end thereof in the same plane as said first caliper-like measuring tip, a third member slidably engaging said rod-like member adjacent said upper end thereof, a fourth member connected to said upper end of said caliper legs slidably associated with said third member to enable movement of said upper end of said caliper legs parallel to said surface of said beam-like member, sixth means associated with said upper end of said caliper legs to ensure that said caliper legs are equidistant from said center line of said bore hole and that said first and second caliper-like measuring tips are always centered in said bore hole and directly opposite each other to enable an accurate measurement of said diameter of said bore hole, and meter means associated with said upper end of said caliper legs to record said measurement of said diameter of said bore hole.

18. A gauge according to claim 1, wherein
said fourth means includes a channel-like member slidably engaging an outer surface of said first means in a spaced relation to said third means, said channel-like member having a second longitudnal slot therethrough aligned with said first slot, a rod-like member extending through and slidably engaging said first and second slots in a perpendicular relationship with said surface, a depth gauge secured to said rod-like member adjacent an upper end thereof and in contact with said channel-like member to record the depth of said bore hole when said rod-like member is moved vertically into said bore hole and a lower end thereof touches the bottom of said bore hole, and a first caliper-like measuring tip secured to said lower end of said rod-like member.

19. A gauge according to claim 18, wherein
said fifth means includes two caliper legs interconnected at an upper end thereof, said caliper legs slidably engaging said first and second slots, one of said caliper legs having a lower end thereof pivotably connected to said lower end of said rod-like member adjacent said first caliper-like measuring tip and the other of said caliper legs having a second caliper-like measuring tip secured to a lower end thereof in the same plane as said first caliper-like measuring tip, a third member slidably engaging said rod-like member adjacent said upper end thereof, a fourth member connected to said upper end of said caliper legs slidably associated with said third member to enable movement of said upper end of said caliper legs parallel to said surface of said beam-like member, sixth means associated with said upper end of said caliper legs to ensure that said caliper legs are equidistant from said center line of said bore hole and that said first and second caliper-like measuring tips are always centered in said bore hole and directly opposite each other to enable an accurate measurement of said diameter of said bore hole, and meter means associated with said upper end of said caliper legs to record said measurement of said diameter of said bore hole.

20. A gauge according to claim 1, wherein
said fifth means includes two caliper legs interconnected at an upper end thereof, said caliper legs slidably engaging said first slot and said first portion of said fourth means, one of said caliper legs having a lower end thereof pivotably connected to said second portion of said fourth means adjacent a first caliper-like measuring tip secured thereto and the other of said caliper legs having a second caliper-like measuring tip secured to a lower end thereof in the same plane as said first caliper-like measuring tip, a third member slidably engaging said third portion of said fourth means, a fourth member connected to said upper end of said caliper legs slidably associated with said third member to enable movement of said upper end of said caliper legs parallel to said surface, sixth means associated with said upper end of said caliper legs to ensure that said caliper legs are equidistant from said center line of said bore hole and that said first and second caliper-like measuring tips are always centered in said bore hole and directly opposite each other to enable an accurate measurement of said diameter of said bore hole, and meter means associated with said upper end of said caliper legs to record said measurement of said diameter of said bore hole.

* * * * *